United States Patent Office 3,534,036
Patented Oct. 13, 1970

---

3,534,036
2 - TRICHLOROMETHLY - 4 - N' - PHENYL PIPERAZINO-6-ALKANOLAMINO-s-TRIAZINES
Werner Heimberger, Hanau am Main, Germany, assignor to Deutsche Gold- und Silber-Scheideanstalt vormals Roessler, Frankfurt am Main, Germany
No Drawing. Continuation-in-part of application Ser. No. 535,314, Mar. 18, 1966. This application Mar. 16, 1967, Ser. No. 623,548
Claims priority, application Germany, Mar. 19, 1966, D 49,643
The portion of the term of the patent subsequent to Aug. 19, 1986, has been disclaimed
Int. Cl. C07d 55/20
U.S. Cl. 260—249.9                    7 Claims

ABSTRACT OF THE DISCLOSURE

Novel substituted triazines of the formula

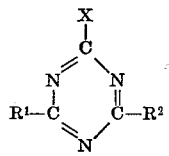

in which X represents —CCl$_3$, —CHCl$_2$ or —CH$_2$Cl, R$^1$ represents piperidino, morpholino, piperazino, N'-alkyl piperazino (alkyl=1–4 C atom alkyl) N'-alkanol piperazino (alkanol=1–4 C atom alkanol), N'-phenyl piperazino, N'-substituted phenyl piperazino in which the substituted phenyl group is phenyl substituted by one or more of the following: alkyl of 1–4 C atoms, —NO$_2$ or halogen atoms, preferably, chlorine, R$^2$ represents one of the groups specified for R$^1$ or

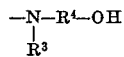

in which R$^3$ is lower alkyl with 1–6 C atoms or, preferably, hydrogen, and R$^4$ is a lower alkylene with 1–6 C atoms. Such compounds have valuable pharmaceutical properties, especially an antiphlogistic or anti-inflammatory action and an analgesic action.

---

Cross-reference to related application

This application is a continuation-in-part of application Ser. No. 545,314, filed Mar. 18, 1966, now Pat. 3,462,430, issued Aug. 30, 1969.

Field of invention

The present invention concerns novel 2,4,6 substituted s-triazines carrying a mono-, di- or trichloromethyl substituent and a heterocyclic ring substituent selected from the group consisting of piperazine, morpholine and piperidine substituents in one of the other positions and such a heterocyclic ring substituent or an alkanol amino substituent in the third position.

Summary

The present invention relates to novel substituted triazines of the formula

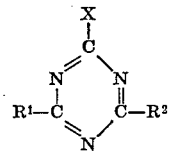

in which X represents —CCl$_3$, —CHCl$_2$ or —CH$_2$Cl, R$^1$ represents piperidino, morpholino, piperazino, N'-alkyl piperazino (alkyl=1–4 C atom alkyl), N'-alkanol piperazino (alkanol=1–4 C atom alkanol), N'-phenyl piperazino, N'-substituted phenyl piperazino in which the substituted phenyl group is phenyl substituted by one or more of the following: alkyl of 1–4 C atoms, —NO$_2$ or halogen atoms, preferably, chlorine, R$^2$ represents one of the groups specified for R$^1$ or

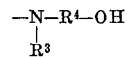

in which R$^3$ is lower alkyl with 1–6 C atoms or, preferably, hydrogen, and R$^4$ is a lower alkylene with 1–6 C atoms, such compounds have valuable pharmaceutical properties, especially an antiphlogistic or anti-inflammatory action and an analgesic action.

Detailed description of the invention including preferred embodiments

The compounds according to the invention can be produced by the following procedures:

(a) Reacting a compound of the formula

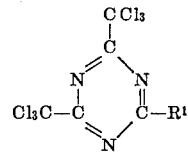

EXAMPLE 1

47.6 g. (0.1 mol) of 2,6 - bis - trichloromethyl-4-N'-phenyl-piperazino-s-triazine were suspended in 250 ml. of methanol and heated for 6 hours under reflux with 18.3 g. (0.3 mol) of ethanol amine. Solution occurred after 1 hour. One-half of the methanol was then distilled off and the residue allowed to stand overnight for crystallization. After filtering and washing with water, 35.5 g. of 2 - trichloromethyl - 4 - phenyl-piperazino-6-ethanolamino-s-triazine of a melting point of 138–141° C. (85.1% of theory) were obtained.

EXAMPLE 2

47.6 g. (0.1 mol) of 2,6 - bis-trichloromethyl-4-N'-phenyl-piperazino-s-triazine were suspended in 250 ml. of methanol and heated for 6 hours under reflux with 22.5 g. (0.3 mol) of isopropanol amine. Solution occurred after 1 hour. One-half of the methanol was then distilled off and the residue allowed to stand overnight for crystallization. After filtering and washing with water, 31 g. of 2 - trichloromethyl - 4-phenyl-piperazino-6-isopropanol-amino-s-triazine of a melting point of 160–170° C. (decomp.) (71.8% of theory) were obtained.

EXAMPLE 3

49.0 g. (0.1 mol) of 2,6-bis-trichloromethyl-4-N'-p-methylphenyl-piperazino-s - triazine were suspended in 250 ml. of methanol and heated under reflux for 6 hours with 18.3 g. (0.3 mol) of ethanol amine. Solution occurred after 45 minutes. Upon cooling 2-trichloromethyl-4-N'-p-methylphenylpiperazino-6 - ethanolamino - s - triazine crystallized out. After filtering and washing with alcohol and water and drying, 40 g. (92.5% of theory) of such crystals with a melting point of 165–160° C. were obtained.

EXAMPLE 4

49.0 g. (0.1 mol) of 2,6-bis-trichloromethyl-4-N'-p-methylphenyl-piperazino - s - triazine were suspended in 250 ml. of methanol and heated under reflux for 6 hours with 22.5 g. (0.3 mol) of isopropanol amine. Solution occurred after 45 minutes. Upon cooling 2-trichloromethyl-4-N'-p-methylphenylpiperazino - 6 - isopropanol-amino-s-triazine crystallized out. After filtering and washing with alcohol and water and drying, 37.9 g. (85% of theory) of such crystals with a melting point of 155–158° C. were obtained.

EXAMPLE 5

(a) 51.05 g. (0.1 mol) of 2,6-bis-trichloromethyl-4-N'-p-chlorophenyl-piperazino-s - triazine were suspended in 250 ml. of methanol and heated under reflux for 6 hours with 18.3 g. (0.3 mol) of ethanol amine. Solution occurred after 3 hours. After processing as in Example 3, 30.8 g. (82.8% of theory) of 2-trichloromethyl-4-N'-p-chlorophenylpiperazino-6-ethanol-amino-s - triazine of a melting point of 150–155° C. were obtained.

(b) The procedure under (a) was repeated using 22.5 g. of isopropanol amine in place of the 18.3 g. of ethanol amine. 30 g. (78.2% of theory) of 2-trichloromethyl-4-N'-p-chlorophenylpiperazino - 6 - isopropanol amino-s-triazine of a melting point of 147–151° C. were obtained.

EXAMPLE 6

(a) 86.7 g. (0.2 mol) of 2,4,6 - tris-trichloromethyl-s-triazine were suspended in 200 ml. of methanol and 26.0 g. (0.2 mol) of N-2-hydroxy-ethylpiperazine added thereto at room temperature. Solution occurred after the mixture had been heated to 40° C. After standing overnight the solution was concentrated and the residue taken up in 200 ml. of methylene chloride, washed several times with water and then concentrated. The syrupy residue according to a layer chromatogram was about 95% pure and elemental analysis gave the values for 2,6-bis-trichloromethyl-4-N'-(2-hydroxyethyl)-piperazino-s - triazine. The yield was 81.5 g. or 91.8% of theory.

(b) 45 g. (about 0.1 mol) of the triazine compound obtained under (a) were dissolved in 150 ml. of alcohol and heated for 8 hours under reflux with 18.3 g. (0.3 mol) of ethanol amine. The solution was concentrated under vacuum whereupon the triazine compound crystallized out. The residue was washed several times with water and then dried. 30 g. (77.8% of theory) of 2-trichloromethyl-4-N'-(2-hydroxyethyl) - piperazino - 6 - ethanolamino-s-triazine of a melting point of 127–130° C. were obtained.

I claim:
1. 2-trichloromethyl-4-N' - phenyl - piperazino - 6-ethanolamino-s-triazine.
2. 2-trichloromethyl - 4 - N' - phenyl - piperazino - 6-isoproponolamino-s-triazine.
3. 2-trichloromethyl - 4-N'-p-methylphenylpiperazino-6-ethanolamino-s-triazine.
4. 2-trichloromethyl - 4-N'-p-methylphenylpiperazino-6-isopropanolamino-s-triazine.
5. 2-trichloromethyl - 4-N'-p-chlorophenylpiperazino-6-ethanolamino-s-triazine.
6. 2 - trichloromethyl - 4-N'-p-chlorophenylpiperazino-6-isopropanolamino-s-triazine.
7. 2 - trichloromethyl - 4-N'-(2-hydroxyethyl)-piperazino-6-ethanolamino-s-triazine.

No references cited.

ALEX MAZEL, Primay Examiner

J. TOVAR, Assistant Examiner

U.S. Cl. X.R.
424—249